United States Patent
Flynn

(10) Patent No.: US 7,677,634 B2
(45) Date of Patent: Mar. 16, 2010

(54) FOLDABLE TOP ASSEMBLY FOR A GOLF CART

(76) Inventor: Daniel J. Flynn, 8317 Belfry Pl., Port St. Lucie, FL (US) 34986

( * ) Notice: Subject to any disclaimer, the term of this patent is extended or adjusted under 35 U.S.C. 154(b) by 15 days.

(21) Appl. No.: 11/719,023

(22) PCT Filed: Nov. 3, 2005

(86) PCT No.: PCT/US2005/039739
§ 371 (c)(1),
(2), (4) Date: Mar. 31, 2008

(87) PCT Pub. No.: WO2006/052628
PCT Pub. Date: May 18, 2006

(65) Prior Publication Data
US 2008/0265611 A1    Oct. 30, 2008

Related U.S. Application Data

(60) Provisional application No. 60/626,632, filed on Nov. 10, 2004.

(51) Int. Cl.
*B60J 7/00* (2006.01)
(52) U.S. Cl. .............. 296/107.09; 296/107.17
(58) Field of Classification Search .......... 296/107.09, 296/107.01, 107.08, 107.11, 108, 136.01, 296/77.1, 102; 280/47.18, DIG. 5; 135/128, 135/124
See application file for complete search history.

(56) References Cited

U.S. PATENT DOCUMENTS

| | | | | |
|---|---|---|---|---|
| 670,268 | A * | 3/1901 | Braun | 296/111 |
| 1,357,239 | A * | 11/1920 | Krok | 296/78.1 |
| 3,284,130 | A * | 11/1966 | Michael | 296/78.1 |
| 3,306,625 | A * | 2/1967 | Ottosson | 296/102 |
| D236,098 | S * | 7/1975 | Bedel | D12/16 |
| 4,461,609 | A * | 7/1984 | Zinno | 414/495 |
| 4,846,524 | A | 7/1989 | Gerber | |
| 4,950,017 | A * | 8/1990 | Norton | 296/102 |
| 5,058,943 | A * | 10/1991 | Louderback | 296/107.09 |
| 5,080,432 | A * | 1/1992 | Connell | 297/184.15 |
| 5,385,379 | A | 1/1995 | Heavner | |
| 5,387,010 | A | 2/1995 | Mohr | |
| 5,588,690 | A * | 12/1996 | Showalter | 296/77.1 |
| 5,791,720 | A * | 8/1998 | Moore et al. | 296/96.2 |
| 5,842,732 | A * | 12/1998 | Daggett et al. | 296/107.17 |
| 6,220,647 | B1 | 4/2001 | Winkler | |
| 6,227,603 | B1 | 5/2001 | Brock | |
| 6,557,922 | B1 * | 5/2003 | Hommel | 296/107.17 |

(Continued)

*Primary Examiner*—Kiran B. Patel
(74) *Attorney, Agent, or Firm*—McGarry Bair PC

(57) ABSTRACT

A foldable top assembly for a golf cart having front and rear ends, passenger seating therebetween, rear support attachments disposed rearwardly of front passenger seating, and front supports mounted in front of the passenger seating is disclosed. The foldable top assembly includes an articulated frame including a pair of spaced, longitudinally extending main members connectable to the rear support attachments. A plurality of transversely extending support members is connected to the pair of longitudinally extending main members. A front support member is connected to ends of the longitudinally extending frame members and is detachably connectable to the front supports on the golf cart. A foldable top, such as a fabric or rigid top is mounted on the articulated frame. The frame is foldable to fold and nest the top in a storage position and unfoldable to a use position to cover the passenger seating.

18 Claims, 9 Drawing Sheets

U.S. PATENT DOCUMENTS

| | | |
|---|---|---|
| 6,578,854 B2 | 6/2003 | Wucherpfennig et al. |
| 6,584,926 B1 * | 7/2003 | Schmitt et al. ........... 135/88.01 |
| 6,601,904 B2 | 8/2003 | Winkler |
| 6,663,162 B1 | 12/2003 | Tyrer |
| D497,587 S | 10/2004 | Tyrer |
| 6,902,220 B2 * | 6/2005 | Moskos et al. .............. 296/102 |
| 6,945,188 B2 * | 9/2005 | Eck et al. .................... 114/361 |
| 6,979,044 B2 | 12/2005 | Tyrer |
| D569,333 S * | 5/2008 | Hartford .................... D12/401 |
| 7,418,918 B2 * | 9/2008 | Bierbower et al. ....... 135/88.01 |
| 7,438,345 B2 * | 10/2008 | Mrotek ....................... 296/116 |
| 7,503,607 B2 * | 3/2009 | Sersland et al. ........ 296/190.04 |
| 2004/0026955 A1 * | 2/2004 | Dolan et al. ........... 296/100.01 |
| 2005/0173076 A1 | 8/2005 | Nation |
| 2006/0028046 A1 | 2/2006 | Tyrer |

* cited by examiner

FOLDABLE TOP ASSEMBLY FOR A GOLF CART

CROSS-REFERENCE TO RELATED APPLICATIONS

This application claims priority on International Application No. PCT/US2005/039739, filed Nov. 3, 2005, which claims the benefit of U.S. Provisional Patent Application No. 60/626,632, filed Nov. 10, 2004, both of which are incorporated herein in their entirety.

TECHNICAL FIELD

This invention relates to golf carts and more specifically to foldable tops for a golf cart.

BACKGROUND OF THE INVENTION

It is known in the art relating to golf carts to provide a top to protect passengers from rain and sun. Many golf cart tops are sold aftermarket as kits or accessories. Others are purchased and installed as an integral part of the golf cart by the manufacturer. Such golf cart tops are generally of single piece rigid construction that is fixedly fastened to a support mount on the golf cart.

There are times, however, when it is desirable to not have a top over the golf cart, for example, on a mild sunny day. Moreover, it is often the case that outdoor weather conditions will change as a person is golfing, such as from a condition in which it is desirable to have a top to a condition in which it is more desirable to not have a top. Yet most golf cart tops are not conveniently removable by a golfer on the golf course, since removal requires special tooling.

U.S. Pat. No. 4,846,524 to Gerber discloses a fold down top for a golf cart. The fold down top includes a frame system having first and third generally rectangular-shaped perimeter frame members and a second U-shaped frame member. The frame system is foldable from an open disposition to a closed storage disposition in the rear of the golf cart. When the foldable top of Gerber is in the open position, however, the front end is cantilevered over the front of the golf cart with the only structural support being in the rear.

Accordingly, there is a need for an improved foldable top assembly for a golf cart that can be easily manipulated from an unfolded use position to a folded storage position without the use of special tooling. Additionally, the foldable top should have sufficient strength and stability in the use position. Also, a top is desired that provides a window option. Further, when in the storage position, the foldable top should not interfere with the golf cart seating area or operator line of sight.

SUMMARY OF THE INVENTION

The present invention provides a foldable top assembly for a golf cart having front and rear ends. The assembly includes an articulated frame, which supports either a fabric top or a rigid, e.g. plastic, fiberglass or similar, top. The frame is supported in the rear of the golf cart by rear support attachments that may include a golf cart bag support, sweater basket, seat back support, or similar. The frame is supported in the front of the golf cart by front supports, which may include a windshield frame or support. The frame is adapted to detachably connect to the front support structure.

In an exemplary embodiment of the present invention, a foldable top assembly is provided for a golf cart having one or more rows of seating. A typical golf cart with which the foldable top assembly is used has front and rear ends, passenger seating therebetween, and a rearwardly disposed golf club bag support or open compartment for golf bag storage and/or storage of other miscellaneous items. The foldable top assembly includes a rear support section connectable to rear support attachments such as a golf club bag support, a seat frame, or body of the golf cart, and extending generally upwards therefrom. The foldable top assembly further includes an articulated frame having a pair of spaced, longitudinally extending main members fixedly or pivotally connected to the rear support section. A plurality of top support members are connected to the pair of longitudinally extending main members and are disposed generally perpendicular thereto in a transverse direction. A front support member is connected to ends of the longitudinally extending frame members and is detachably connectable to a forward support structure on the golf cart. A fabric top is supported by the articulated frame. Alternatively, the top may be a rigid top such as one made of a plastic or fiberglass material. The frame is foldable to manipulate the top to a folded storage position and openable to cover the passenger seating.

The rear support section of the foldable top assembly may include a quick disconnect feature for connecting the rear support section to the golf club bag support, the passenger seating frame, the golf cart body, or any other suitable base on the golf cart. The rear support section may also include an articulated frame connecting portion opposite the golf cart mounting portion for connecting the articulated frame sections to the rear support section.

The longitudinally extending main members of the foldable top assembly may each include a first frame section fixedly or pivotally connected to the frame mounting portion of the rear support section. A second frame section may be hingedly connected to the first frame section by at least a compound second hinge, and a third frame section may be hingedly connected to the second frame section and connectable to a front support such as a windshield support or similar. The hinge members may be made to lock the main members into position and add support to and rigidity to the top structure.

The second frame section of each longitudinally extending main member may be pivoted at the first hinge upwardly and rearwardly, and the third frame section may be pivoted at the second hinge to fold the third frame section over the second frame section. In the storage position of the frame sections, the first, second, and third frame sections are nested together.

The front support member may include opposite ends having, for example, a generally cylindrical cross-section or similar cross-section having outside dimensions sized to slidably fit into hollow sections of the front support structure of the golf cart. A bushing may be disposed between the front support member and front support structure at the connection to facilitate the connection and to eliminate noise.

These and other features and advantages of the invention will be more fully understood from the following detailed description of the invention taken together with the accompanying drawings.

DETAILED DESCRIPTION OF THE INVENTION

Figure 1:
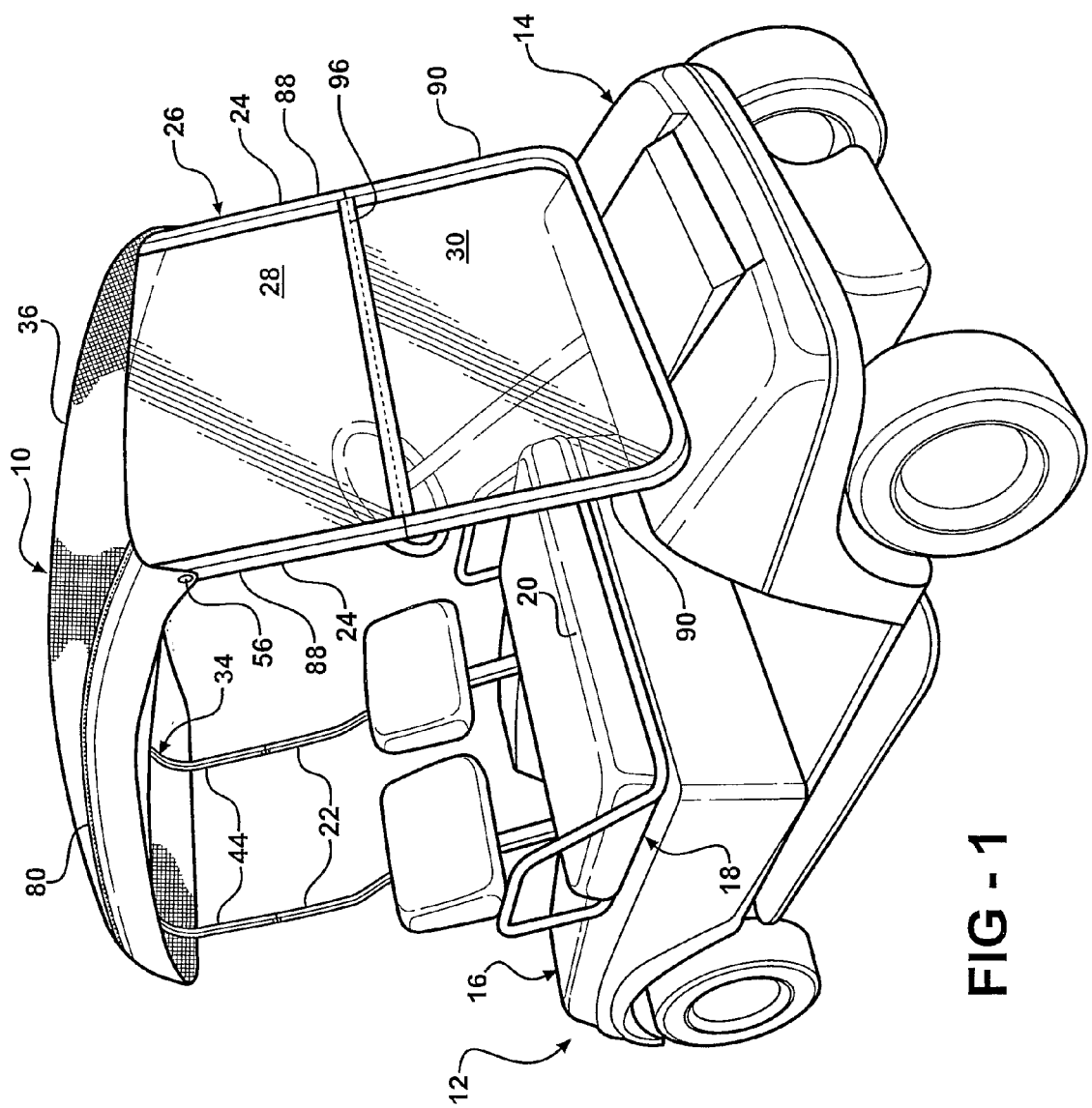
FIG. 1 is a perspective view of a golf cart including a foldable top assembly in accordance with the present invention.

Referring now to the drawings in detail, an exemplary embodiment of a foldable top assembly 10 constructed in accordance with the present invention for use with a golf cart 12 is generally shown. The golf cart 12 includes a front portion 14, a rear portion 16, and a passenger seating area 18 therebetween. The passenger seating area 18 may include one or more rows 20 of passenger seating, such as a single front row (see for example FIG. 1) or a front and rear row (see for example FIG. 10). Rear support attachments 22 may be disposed behind front passenger seating 20, and front supports 24 such as pillars of a windshield support or similar may be disposed towards the front 14 of the golf cart 12 in front of the passenger seating 18.

The rear support attachments 22 may include a golf bag support (not shown), an accessory basket (not shown), seating support, or the golf cart itself.

Forward of the golf cart's seating area 18, the golf cart 12 includes a pair of upwardly extending front support pillars 24 which may be used to support an optional front window assembly 26 having upper and lower window sections 28, 30 respectively. The window assembly 26 may be connected and disconnected from the upwardly extending pillars 24. Each pillar 24 may be constructed of hollow tubing and includes an opening 32 at its upper distal end.

Figure 4:
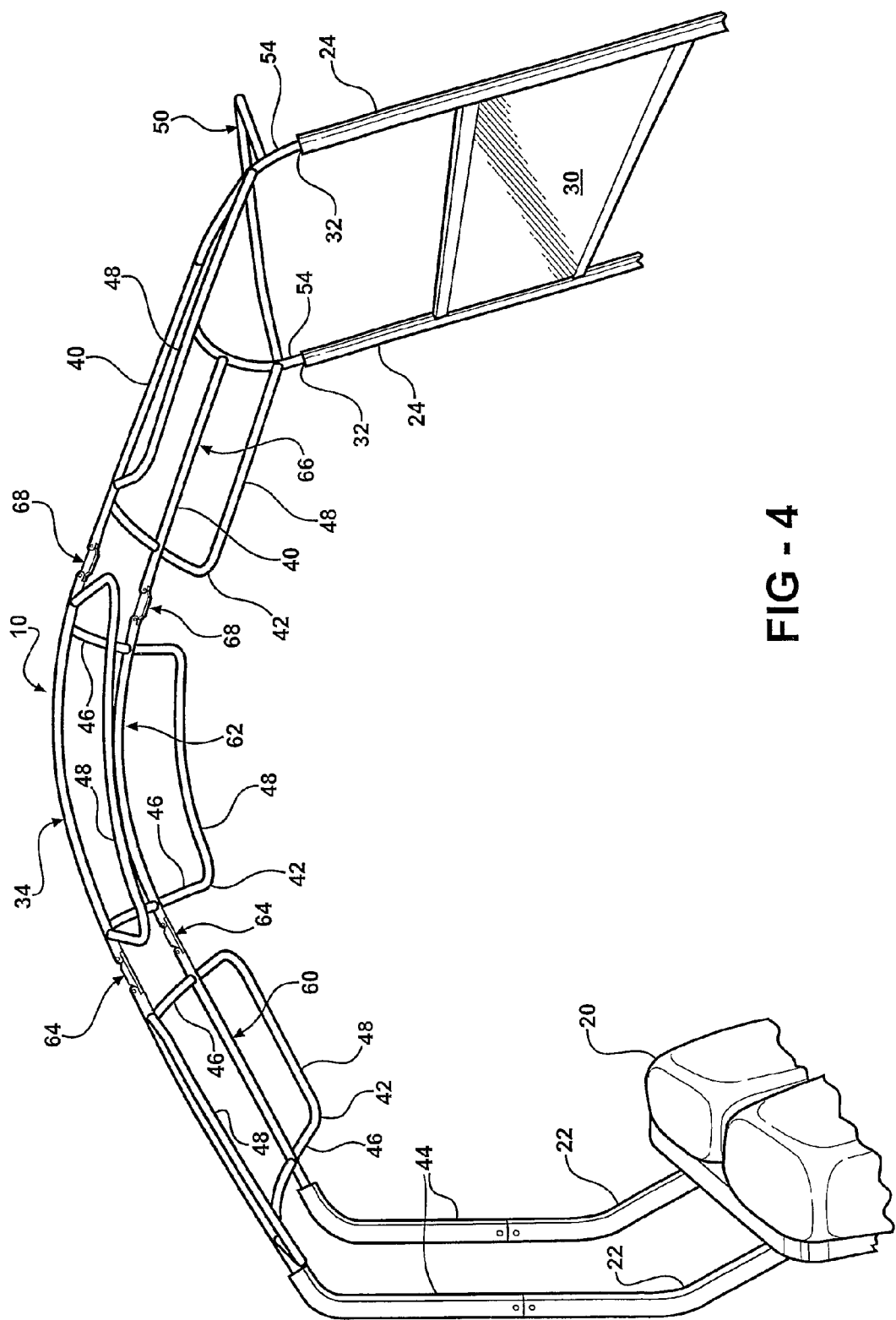
FIG. 4 is an elevational view of the articulated frame illustrating attachment of the frame to the golf cart, and shown disposed in an unfolded use position.
Figure 5:
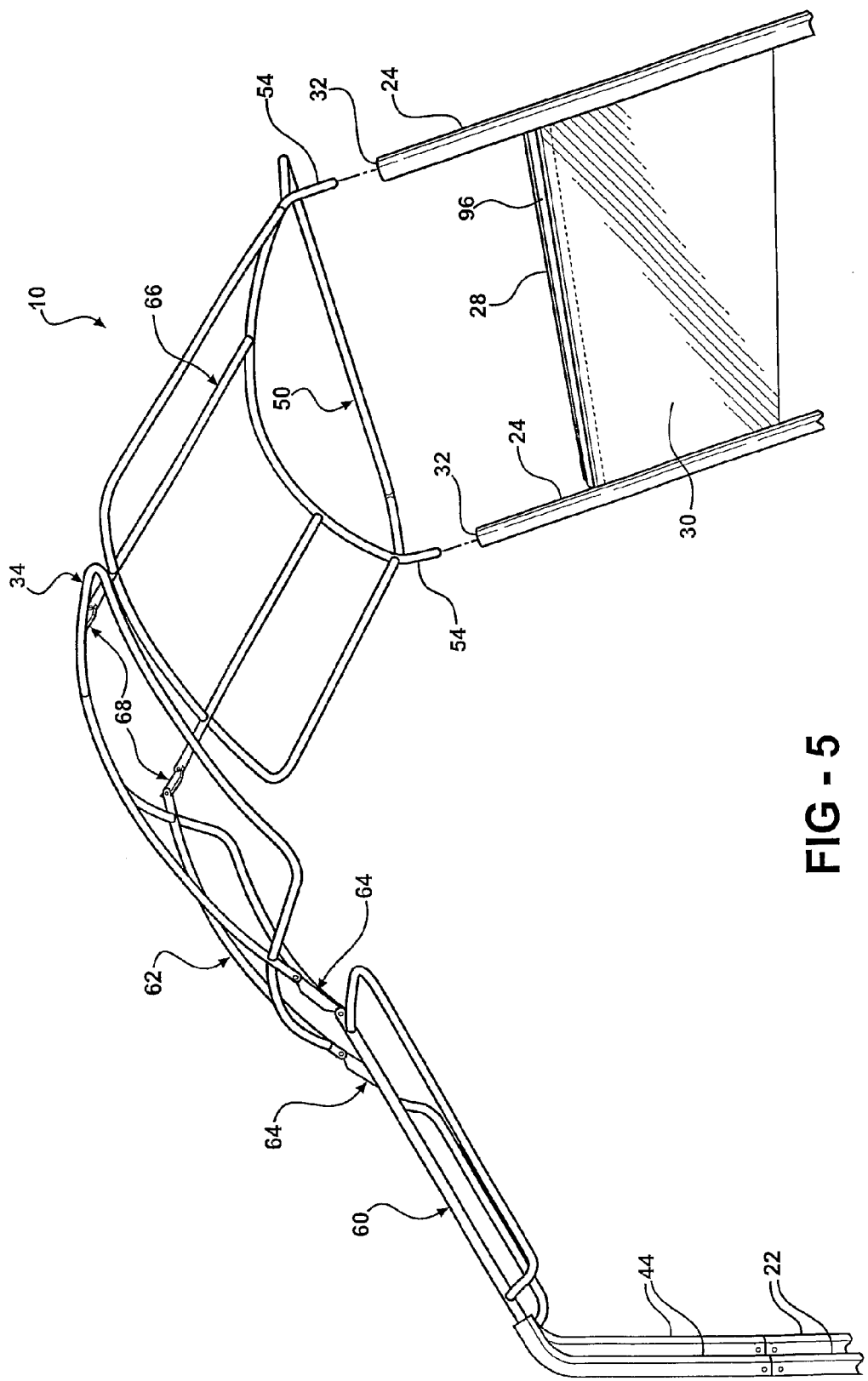
FIG. 5 is an elevational view of the articulated frame intermediate the unfolded use position and a folded storage position.
Figure 6:
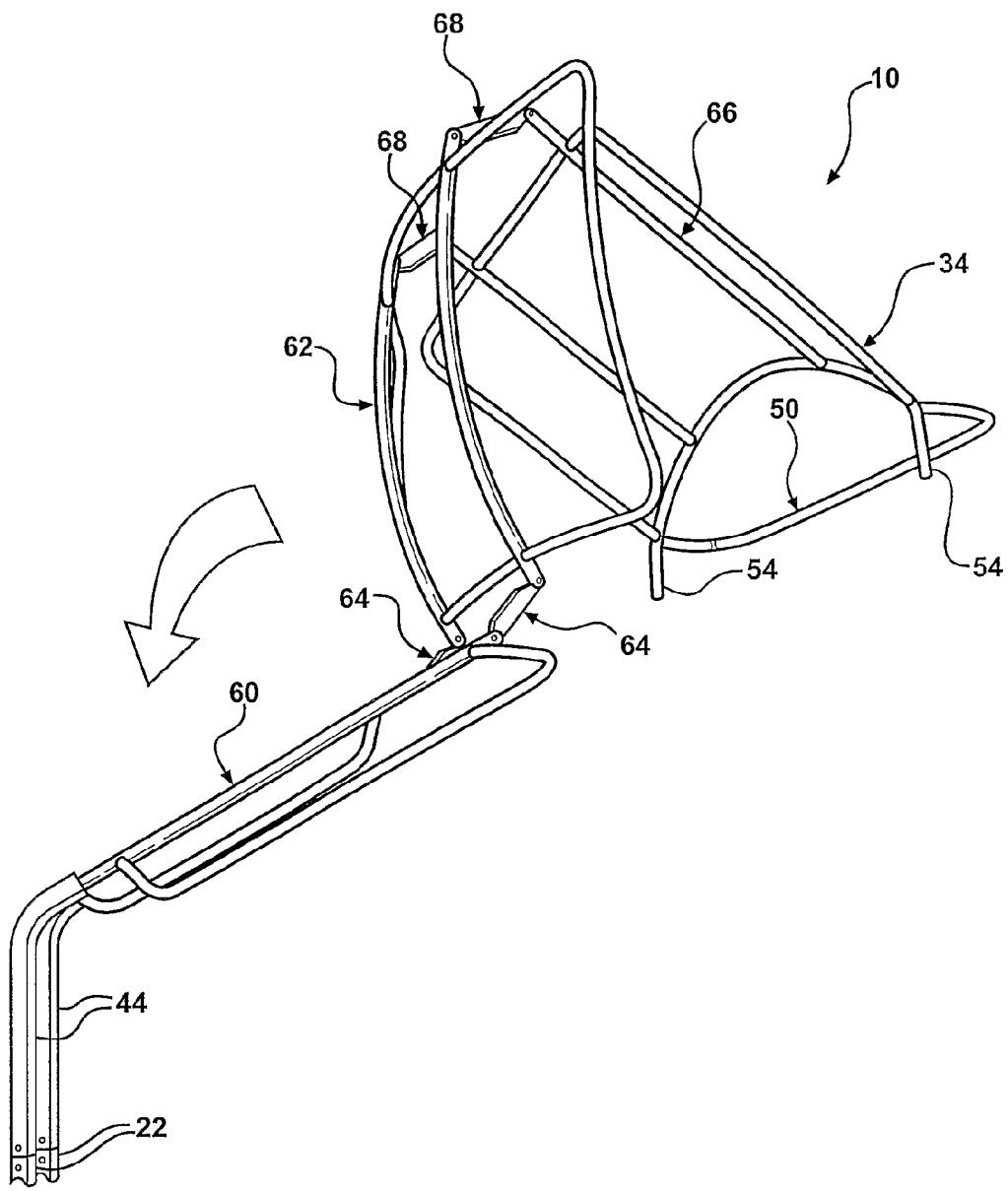
FIG. 6 is another elevational view of the articulated frame intermediate the unfolded use position and the folded storage position.
Figure 7:
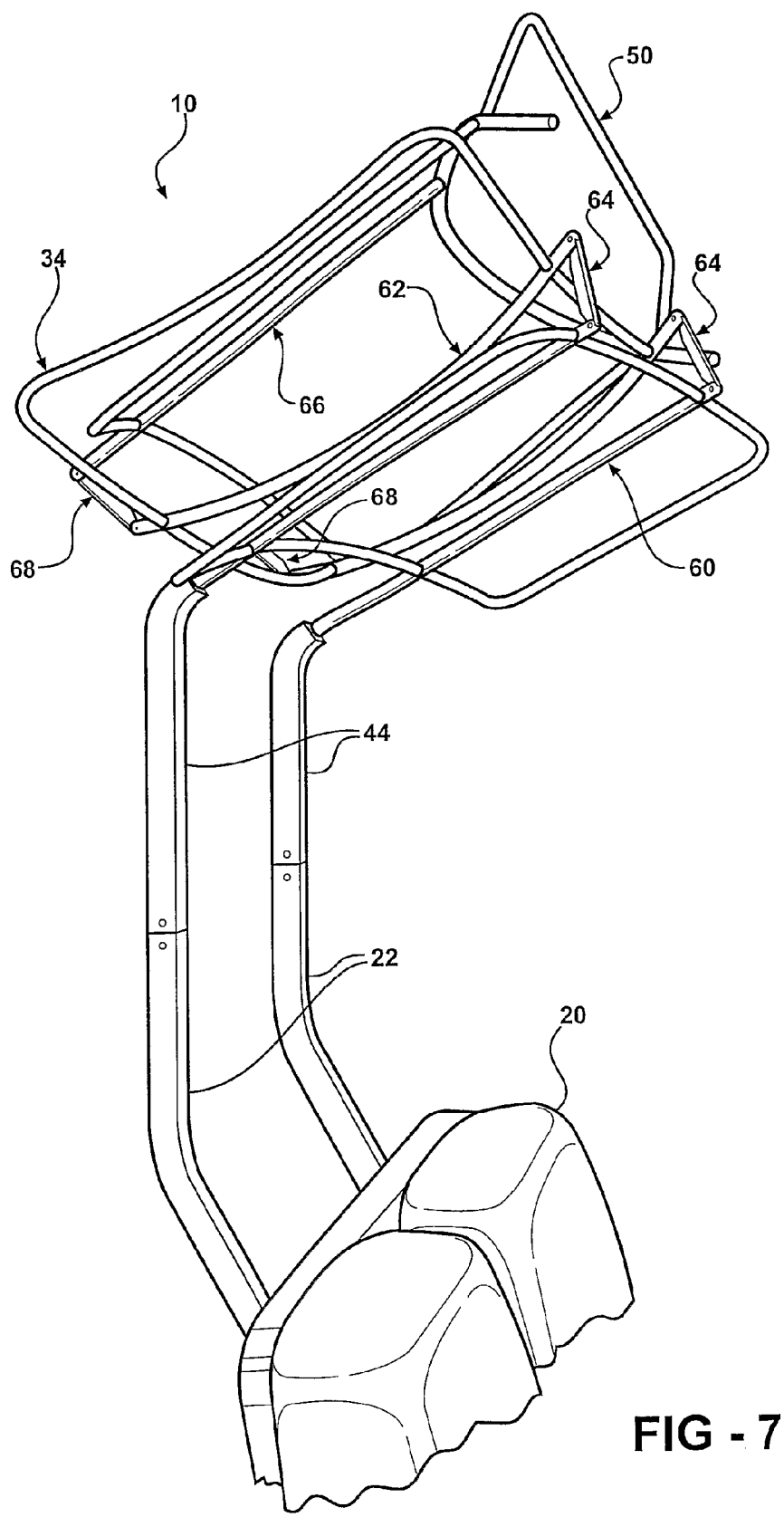
FIG. 7 is an elevational view of the articulated frame in the folded, or nested, storage position.

As will be discussed in greater detail herein, the foldable top assembly 10 has a use position (see for example FIGS. 2 and 4) and a folded storage position (see for example FIGS. 7 and 10). When in the use position, the top assembly 10 is fixedly disposed over the front passenger seating 20. The front supports 24 provide a forward support structure on the golf cart 12 upon which the foldable top assembly 10 is detachably connectable. When manipulated into the storage position, the top assembly 10 is detached from the front supports 24 to fold above the rear support attachments 22 or alternatively to be folded and stored rearward of the front passenger seating 20.

Figure 2:
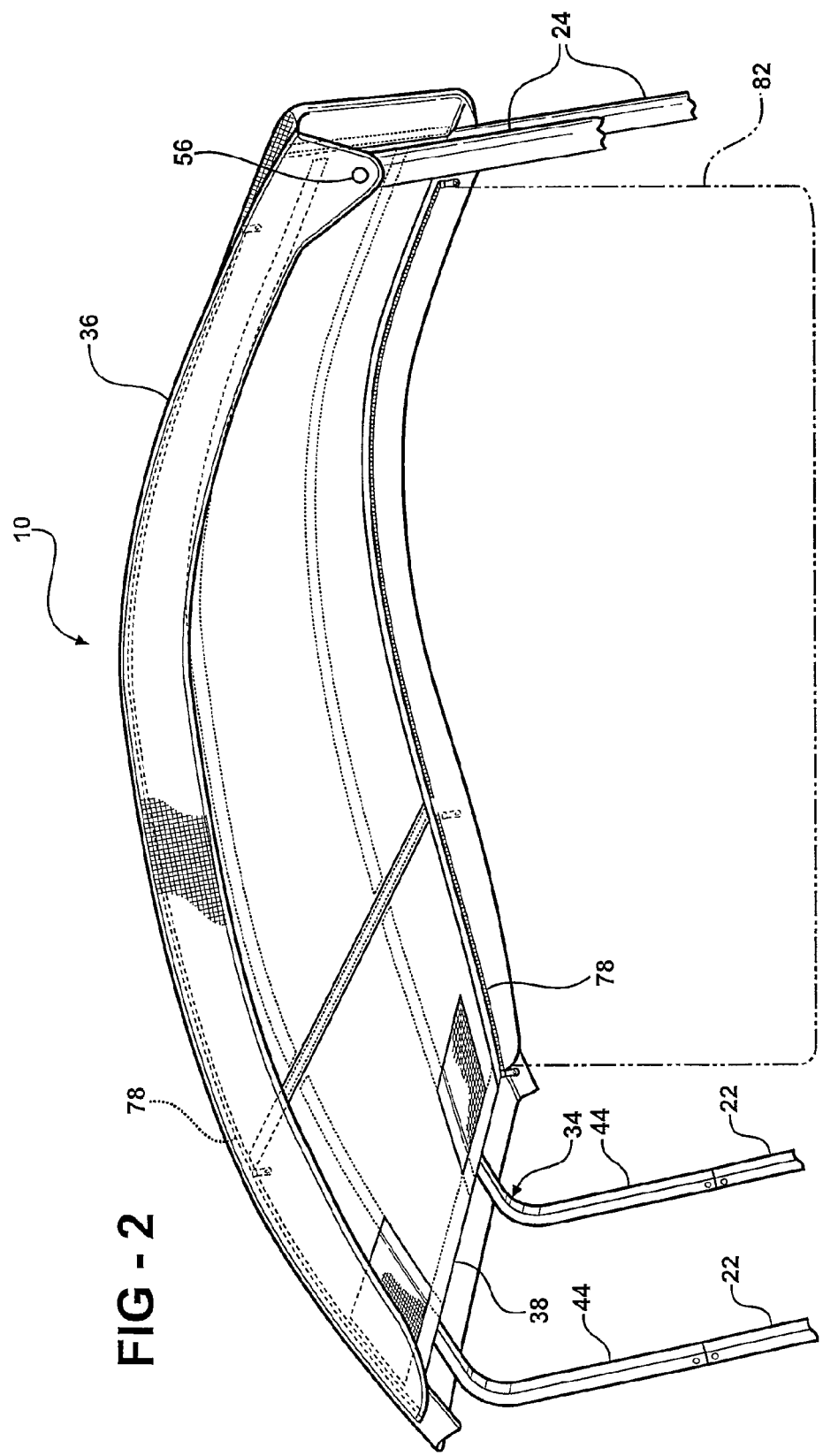
FIG. 2 is an elevational view of a fabric top disposed on the frame illustrating a liner detachably connected to the underside of the top, snap attachments for connecting the top to the front support structure, and optional drip rail assembly.
Figure 3:
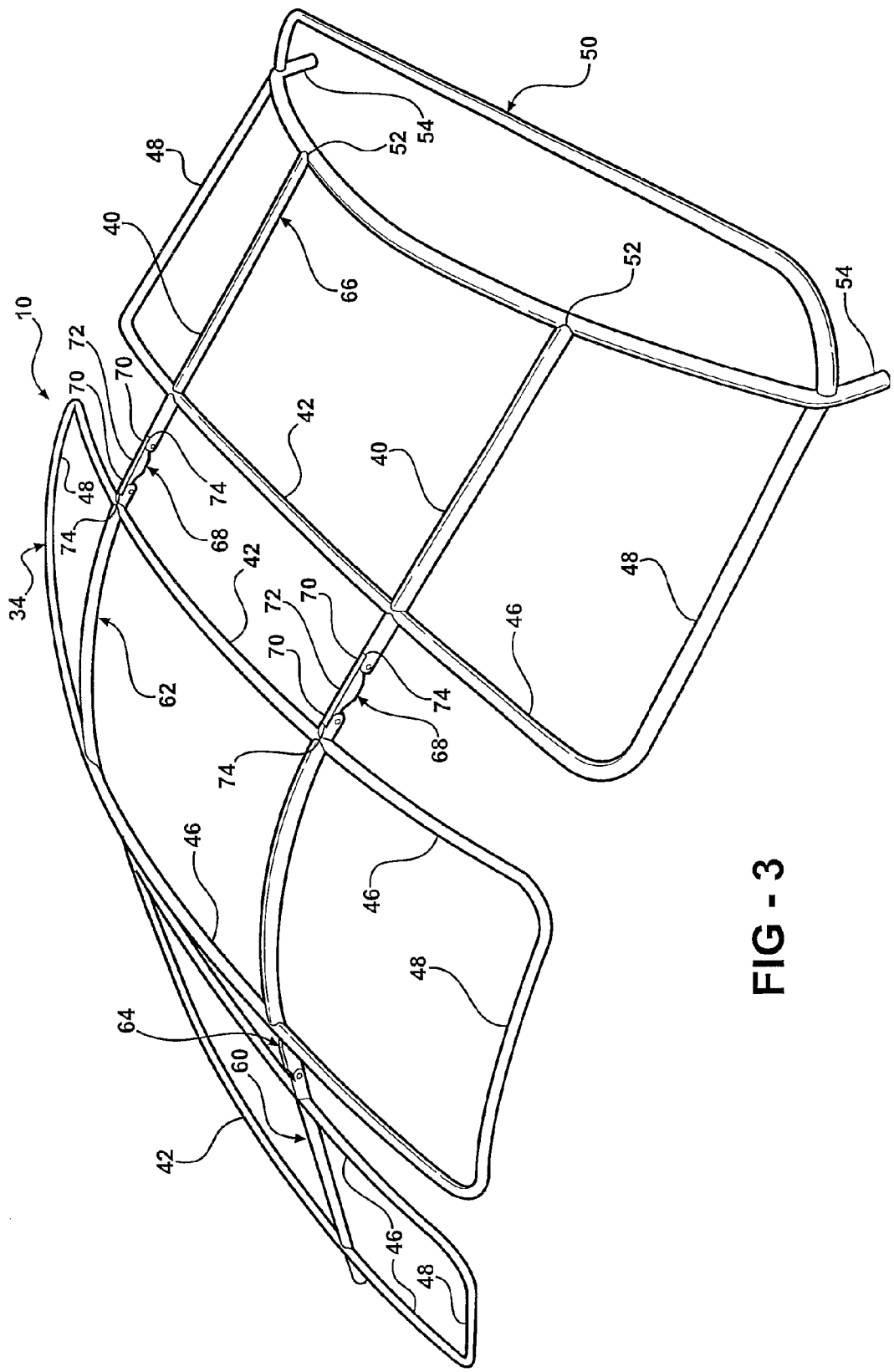
FIG. 3 is a perspective view of an articulated frame of the foldable top assembly of the present invention.

With reference to FIGS. 1 through 7, the foldable top assembly 10 includes an articulated frame 34 and a top 36 supported by the articulated frame 34. The top 36 may be made of a flexible material such as a fabric or similar, or may be made of a rigid material such as a plastic, fiberglass or similar material. As shown in FIG. 2, the top 36 may also optionally include an inside liner 38 to hide the articulated frame 34 from view. The articulated frame 34 is connectable to the golf cart rear support attachments 22.

The articulated frame 34 includes a pair of spaced, longitudinally extending arcuate main members 40 and a plurality of generally laterally disposed arcuate top support members 42. The longitudinal direction generally refers to a direction extending between the front 14 and rear 16 portions of the golf cart 12, and the lateral direction generally refers to a direction extending between left and right sides of the golf cart 12. The main members 40 are fixedly connected to a rear support section 44, but may alternatively be pivotally connected thereto. The main members 40 may have a cylindrical cross-section. The arcuate top support members 42 are connected to the pair of longitudinally extending main members 40. In one embodiment, each top support member 42 includes longer portions 46 that are perpendicular to the main members 40 in a transverse direction and shorter portions 48 that are generally parallel to the main members 40. The articulated frame 34 may also be contoured and may be made from materials such as but not limited to a plastic material, a composite material, or a metal material such as aluminum or steel.

Figure 8:
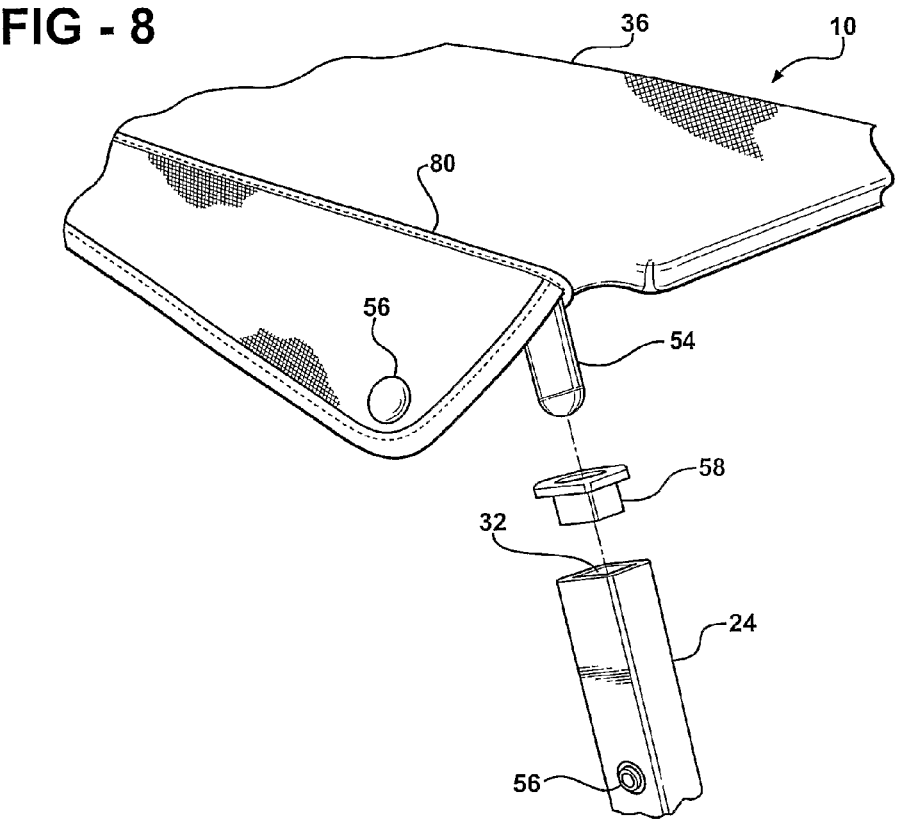
FIG. 8 is a sectional perspective view of the top and one end of a front support member illustrating connection of the front support member to the golf cart front support structure.

A front support member 50 is connected to ends 52 of the longitudinally extending main members 40. The front support member 50 includes opposite ends 54 having generally cylindrical cross-sections with outside diameters that are sized to fit slidably into the hollow open sections 32 of the front support pillars 24. The ends 54 of the front support member 50 may be held in the hollow open sections 32 of the front support pillars 24 by friction alone, or alternatively may be releasably held in the front support pillars 24 by through pins (not shown), snaps 56 attached to the top and the pillars, or similar. As shown in FIG. 8, a plastic or similar bushing 58 may be inserted into the front supports 24 to center the ends 54 of the front support member 50 and to prevent rattle.

Each longitudinally extending main member 40 may include a first frame section 60 fixedly or pivotally connected to the rear support section 44 which is connected to the rear support attachments 22 on the golf cart 12. A second frame section 62 may be hingedly connected to the first frame section 60 by at least a compound first hinge 64, and a third frame section 66 may be hingedly connected to the second frame section 62 by a compound second hinge 68. The third frame section 66 may be connectable to the front supports 24 (e.g., a windshield support) opposite the second hinge 68 via the front support member 50. The second frame section 62 of each longitudinally extending main member 40 may be pivoted at the first hinge 64 upwardly and rearwardly, and the third frame section 66 may be pivoted at the second hinge 68 to fold the third frame section 66 over the second frame section 62. In the storage position of the frame sections, the first, second, and third frame sections 60, 62, 66 are nested together.

In a specific embodiment, each of the first and second compound hinges 64, 68 includes two ends 70 and an extender 72 therebetween. Each end 70 pivotally connects to one of a pair of neighboring frame sections 60, 62, 66. For example, the ends 70 of the first compound hinge 64 pivotally connect to the first and second frame sections 60, 62, while the ends 70 of the second compound hinge 68 pivotally connect to the second and third frame sections 62, 66. The first and second compound hinges 64, 68 are also designed to include stops 74 that define and hold the hinges in a fully extended position corresponding to the unfolded use position of the golf cart top assembly 10. Further, the golf cart top assembly 10 includes a pair of first compound hinges 64 and a pair of second compound hinges 68. The pair of first compound hinges 64 are arranged in an orientation that is rotated 180 degrees relative to the pair of second compound hinges 68. Due to this arrangement, as described above, the first and second frame sections 60, 62 pivot relative to each other in an opposite direction than the second and third frame sections 62, 66, allowing the first, second, and third frame sections to be nested in the folded storage position.

In the embodiment in which the top 36 is made of a fabric material, when the foldable top assembly 10 is in the unfolded use position, the fabric top 36 is stretched taut across the articulated frame 34 and supported thereby. The arcuate shape of both the longitudinally extending main members 40 and top support members 42 curve the fabric top 36 in both the longitudinal and transverse directions. This allows rainwater and/or debris to run freely off of the fabric top 36 without accumulating thereon.

A liner 76 is detachably connectable to the underside of the top 36 via hook and loop, zippers or other known fasteners 78 to sandwich the frame sections 60, 62, 66 therebetween. The top 36 may optionally include a pair of drip rails 80 formed therein along opposing longitudinal edges thereof to help direct rainwater away toward the back end of the top. Moreover, the top 36 may include or be adapted to attach a plurality of transparent windows or other side curtains 82 disposed along the perimeter of the fabric top. The windows 82 or the like may be comprised of a flexible material, which may be folded or rolled into a storage position or unfolded into a use position. Additionally, pockets and other similar features may be mounted on the top, and logos and other graphics can be displayed on the top.

When the top assembly 10 is folded from the use position to the folded storage position, the opposite ends of the front support member 50 are slidably detached from the hollow openings 32 of the front supports 24. The third frame section 66 of each longitudinally extending main member 40 pivots downwardly and rearwardly from the second hinge 68 while the second frame section 62 pivots upwardly at the first compound hinge 64.

Figure 9:
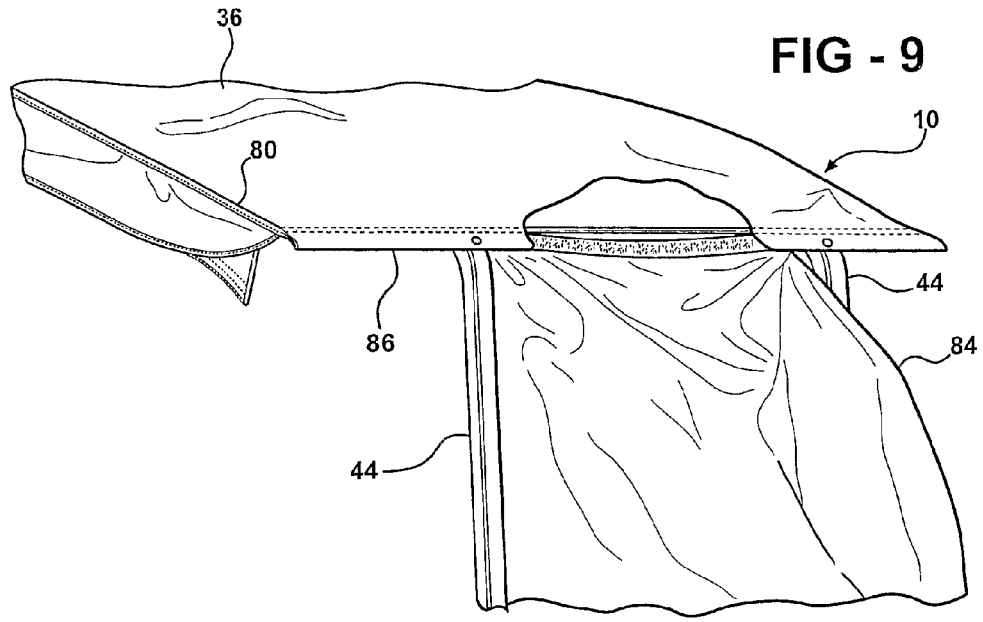
FIG. 9 is a sectional perspective view of the rear of the top which illustrates a boot, storable between the liner and underside of the top, for covering the top in a folded storage and/or nested non-use position.

To secure the top assembly 10 in place when in the folded storage position, the frame sections 60, 62, 66 can be fastened above the rear of the passenger seating 20, or alternatively behind the passenger seating 20, by a variety of means, such as, for example, bungee cords, ropes, straps, snaps or the like. Optionally, as shown in FIGS. 9 and 10, a boot 84 may be used to cover the top assembly 10 in the storage position. The boot 84 may also be used as a rear seat cover for the rear occupants of a four-seat golf cart. Optionally, on a two seat golf cart, the boot 84 may also be used as a golf bag cover. Preferably, the boot 84 is disposed along a rear edge 86 of the fabric or rigid top 36. The boot 84 may be of a fabric construction and storable between the underside of the top 36 and liner 76. Alternatively, the boot 84 can be stored outside the top 36 and can even be disconnectable from the top 36.

Optionally, the front upward support pillars 24 may be window frame pillars of a window frame assembly 26 that provide a unique forward support structure for the foldable top assembly 10 by having the hollow openings 32 in their upper distal ends. Additionally, the window frame assembly 26 and its associated window frame pillars 24 may have another feature. Specifically, the window frame pillars 24 may be split into detachable upper pillar ends 88 and lower pillar ends that support upper and lower windows 28, 30 respectively.

The upper window 28 and lower window 30 may be connected with a hinge member 96, which allows the upper window 28 to be disconnected from the window frame pillars 24 and swung downward against the lower window 30 as desired. Alternatively, the upper pillar ends 88 of the golf cart 12 may also be detached and stored away from a passengers view. The hinge member 96 may be recessed within the upper and lower pillar ends 88, 90.

Figure 10:
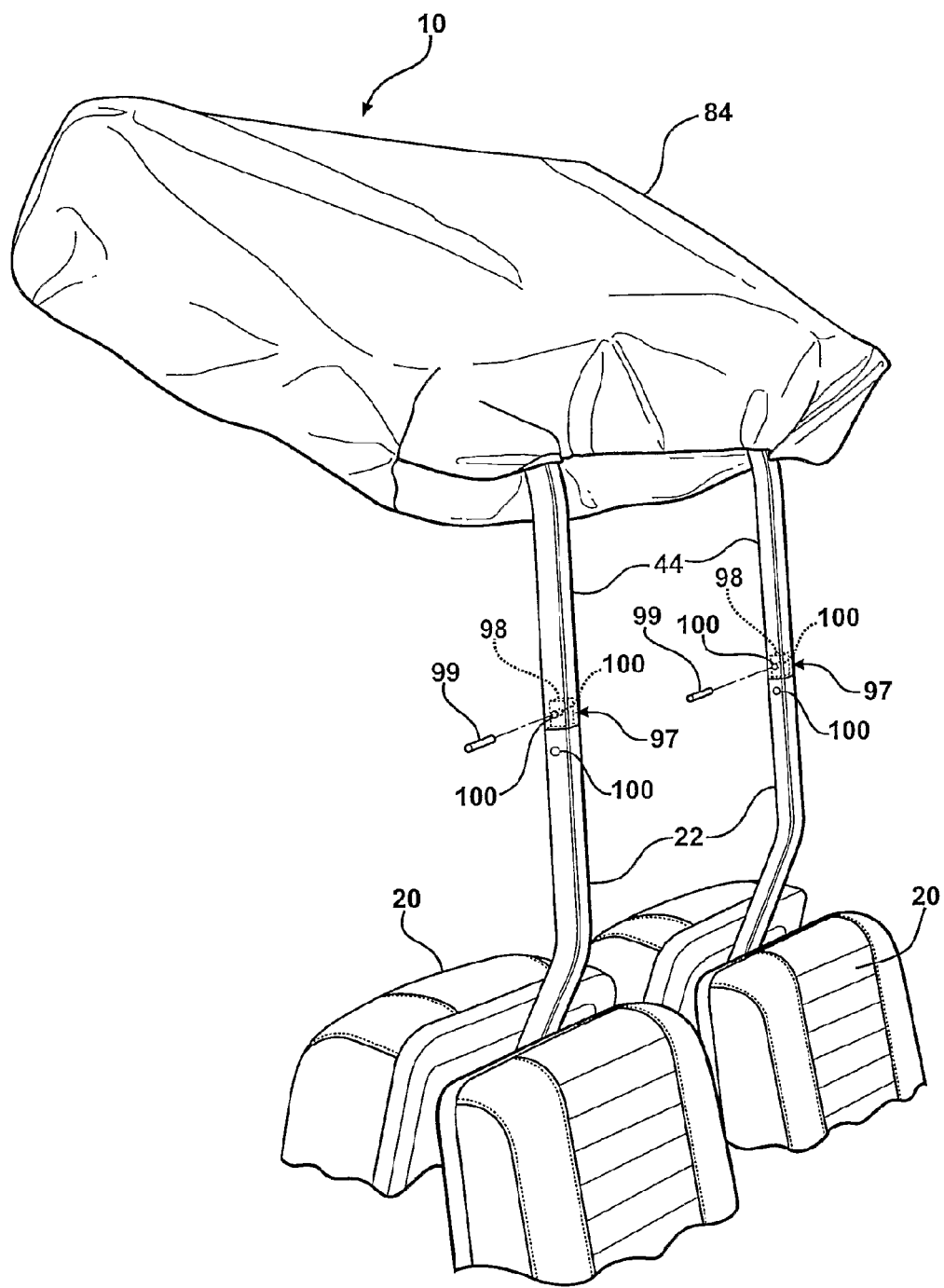
FIG. 10 is a perspective view of the top in a folded, storage position illustrating the boot covering the top.

Additionally, as illustrated in FIG. 10, the rear support section 44 of the articulated frame 34 optionally may be connectable to the rear support attachments 22 of the golf cart 12 by a quick disconnect arrangement 97. The quick disconnect arrangement 97 may be of the type that includes a connector 98 and through pins 99 sized to be received through corresponding apertures 100 in the connectors 98, rear support section 44, and rear support attachments 22. The quick disconnect arrangement 97 allows for easy removal of the top assembly 10 from the golf cart 12.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A foldable top assembly for a golf cart having forward and rearward portions and a passenger seating portion therebetween, rear support attachments disposed rearwardly of the passenger seating portion, and front supports disposed forwardly of the passenger seating portion, the foldable top assembly comprising:
    an articulated frame including:
        a pair of spaced, longitudinally extending main members connectable at first ends to the rear support attachments;
        a plurality of top support members connected to the pair of longitudinally extending main members and disposed generally perpendicular to the main members; and
        a front support member connected to second ends of the longitudinally extending frame members and being detachably connectable to the front supports on the golf cart; and
    a foldable top mounted to the articulated frame;
    the articulated frame being foldable to configure the top in a storage position, and unfoldable to configure the top in a use position to cover the passenger seating portion.

2. The foldable top assembly of claim 1, wherein each of the longitudinally extending main members includes a portion that extends arcuately from the front supports rearwardly in the use position.

3. The foldable top assembly of claim 1, wherein the longitudinally extending main members each include:
    a first frame section connectable to one of the rear support attachments and a rear support section;
    a second frame section hingedly connected to the first frame section by at least a first hinge; and
    a third frame section hingedly connected to the second frame section by at least a second hinge.

4. The foldable top assembly of claim 3, wherein the longitudinally extending main members include a rear support section connectable to the rear support attachments.

5. The foldable top assembly of claim 4, including a quick disconnect mechanism disposed about the rear support attachments for disconnecting the main members from the rear support attachments.

6. The foldable top assembly of claim 3, wherein each hinge comprises two ends, each end being one of connectable to a frame section and connectable to part of the frame section.

7. The foldable top assembly of claim 3, wherein each first hinge is rotatable 180 degrees relative to each second hinge.

8. The foldable top assembly of claim 3, wherein in the storage position the frame sections are nested.

9. The foldable top assembly of claim 1, wherein the top support members extend arcuately between the pair of longitudinally extending main members.

10. The foldable top assembly of claim 1, wherein the front support member extends transversely and arcuately across the front supports of the golf cart when the frame is in the use position.

11. The foldable top assembly of claim 1, wherein the front support member includes opposed ends having a cross section sized to slidably fit into hollow sections of the front supports of the golf cart.

12. The foldable top assembly of claim 1, wherein the top is made of one of a flexible material and a rigid material.

13. The foldable top assembly of claim 1, wherein the top includes a pair of drip rails formed therein along opposing longitudinal edges thereof.

14. The foldable top assembly of claim 1, wherein the top includes a plurality of transparent windows comprised of a flexible material disposed along the perimeter of the top.

15. The foldable top assembly of claim 1, wherein the top includes an interior liner to conceal the articulated frame.

16. The foldable top assembly of claim 1, wherein the front supports of the golf cart define an opposing pair of window frame pillars having an upper pillar end and a lower pillar end, wherein the upper pillar end is movable relative to the lower pillar end.

17. The foldable top assembly of claim 16, wherein the upper and lower pillar ends are connected with a hinge.

18. The foldable top assembly of claim 1, comprising a boot for covering the top in a nested, storage position.

* * * * *